United States Patent [19]

Kobayashi et al.

[11] Patent Number: 5,337,549

[45] Date of Patent: Aug. 16, 1994

[54] STEEL CORD FOR REINFORCEMENT OF RUBBER PRODUCTS

[75] Inventors: Yoshirou Kobayashi, Yashiro; Koichi Hinoura; Akihiro Nagamoto, both of Ono, all of Japan

[73] Assignee: Tokusen Kogyo Company Limited, Ono, Japan

[21] Appl. No.: 93,905

[22] Filed: Jul. 20, 1993

Related U.S. Application Data

[60] Continuation of Ser. No. 863,596, Apr. 3, 1992, abandoned, which is a division of Ser. No. 630,325, Dec. 19, 1990, abandoned.

[30] Foreign Application Priority Data

Dec. 20, 1989 [JP] Japan .................................. 1-331983
Jun. 13, 1990 [JP] Japan .................................. 2-152851

[51] Int. Cl.$^5$ .......................... D02G 3/36; D07B 1/06
[52] U.S. Cl. ......................................... 57/236; 57/311; 57/902; 152/451
[58] Field of Search ................. 57/200, 201, 206, 236, 57/248, 902, 311; 152/451, 527, 556

[56] References Cited

U.S. PATENT DOCUMENTS

| | | | |
|---|---|---|---|
| 916,048 | 4/1909 | Smith | 57/200 |
| 2,998,696 | 9/1961 | Payer . | |
| 4,020,887 | 5/1971 | Vlasov et al. | 152/451 |
| 4,106,957 | 8/1978 | Tourney | 152/451 X |
| 4,240,486 | 12/1980 | Schmit et al. | 152/556 X |
| 4,258,543 | 3/1981 | Canevari et al. . | |
| 4,333,306 | 6/1982 | Yamashita et al. | 57/206 |
| 4,385,486 | 5/1983 | Iwata et al. . | |
| 4,399,853 | 8/1983 | Morimoto et al. . | |
| 4,464,892 | 8/1984 | Kleijwegt . | |
| 4,506,500 | 3/1985 | Miyauchi et al. . | |
| 4,509,318 | 4/1985 | Yoneda | 57/902 |
| 4,516,395 | 5/1985 | Palmer et al. | 57/236 X |
| 4,545,190 | 10/1985 | Rye et al. | 52/236 X |
| 4,566,261 | 1/1986 | Brandyberry et al. | 57/200 |
| 4,644,989 | 2/1987 | Charvet et al. | 152/451 |
| 4,737,392 | 4/1988 | Dambre | 152/451 X |
| 4,738,096 | 4/1988 | Hatakeyama et al. | 57/206 |
| 4,749,017 | 6/1988 | Loesch | 57/902 X |
| 4,836,262 | 6/1989 | Nishizawa et al. . | |
| 4,850,412 | 7/1989 | Gupta | 152/556 |
| 4,938,015 | 7/1990 | Kinoshita | 57/200 |
| 5,020,312 | 6/1991 | Watakabe . | |
| 5,109,661 | 5/1992 | Okamoto et al. . | |
| 5,118,568 | 6/1992 | Okamoto et al. . | |
| 5,162,062 | 11/1992 | Carroll et al. . | |

FOREIGN PATENT DOCUMENTS

| | | |
|---|---|---|
| 0143767 | 6/1985 | European Pat. Off. . |
| 0175633 | 9/1985 | European Pat. Off. . |
| 0225055 | 6/1987 | European Pat. Off. .......... 57/902 |
| 0237462 | 9/1987 | European Pat. Off. .......... 57/902 |
| 0387803 | 3/1990 | European Pat. Off. . |
| 0433962 | 12/1990 | European Pat. Off. . |
| 2473080 | 12/1980 | Fed. Rep. of Germany . |
| 59-156805 | 9/1984 | Japan . |
| 59-157391 | 9/1984 | Japan . |
| 60-21435 | 6/1985 | Japan . |
| 61-108397 | 7/1986 | Japan . |
| 62-41339 | 2/1987 | Japan . |
| 1-250482 | 10/1989 | Japan . |
| 1000823 | 8/1965 | United Kingdom . |
| 2034363 | 6/1980 | United Kingdom . |
| 2098251 | 11/1982 | United Kingdom . |
| 2081765 | 2/1987 | United Kingdom . |
| 88/05624 | 11/1988 | World Int. Prop. O. . |
| 91/04370 | 4/1991 | World Int. Prop. O. . |

OTHER PUBLICATIONS

*Mechanics of Pneumatic Tires*, ed. Samuel Clark: U.S. Dept. of Transportation, Aug. 1981, p. 81.

*Primary Examiner*—Joseph J. Hail, III
*Assistant Examiner*—Michael R. Mansen
*Attorney, Agent, or Firm*—Wenderoth, Lind & Ponack

[57] ABSTRACT

A steel cord for reinforcement of rubber products composed of two material wires of a diameter of 0.25 to 0.40 mm and a carbon content of 0.75 to 0.88 wt % which are entwisted at a twist pitch of 9.0 to 16.0 mm and in open structure, with improved fatigue resistance, flexibility and corrosion resistance.

8 Claims, 4 Drawing Sheets

Fig. 1a
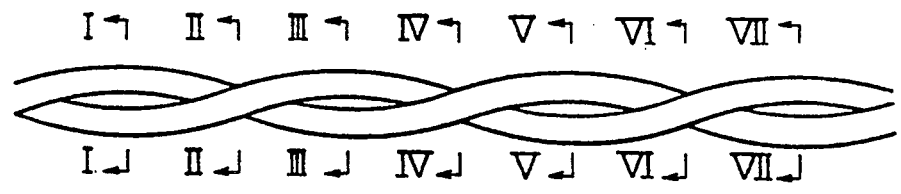
Fig. 1b Fig. 1c Fig. 1d Fig. 1e Fig. 1f Fig. 1g Fig. 1h
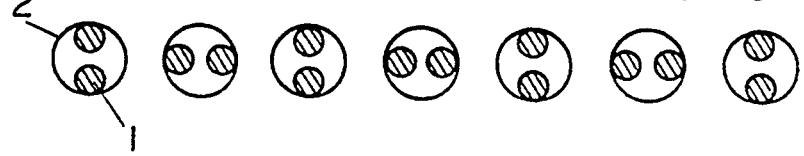
Fig. 2a
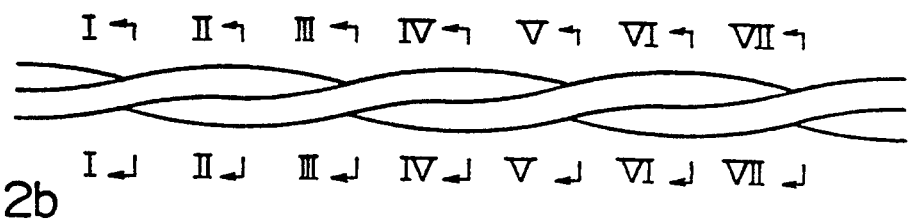
Fig. 2b
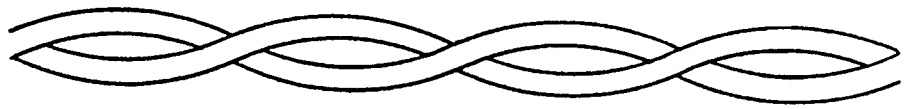
Fig. 2c Fig. 2d Fig. 2f Fig. 2h
Fig. 2e Fig. 2g Fig. 2i
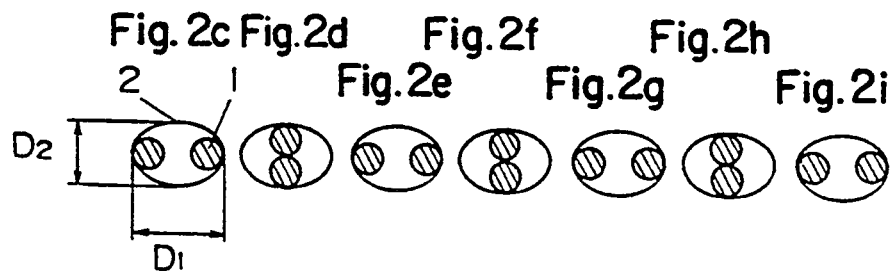

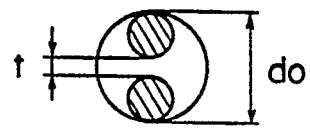
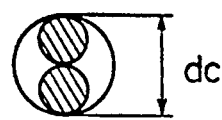
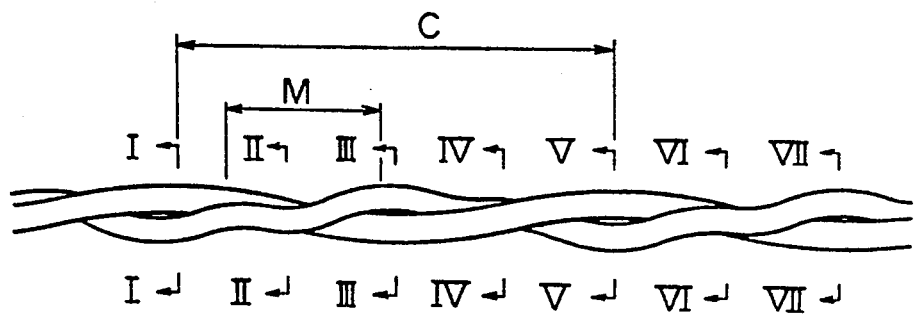
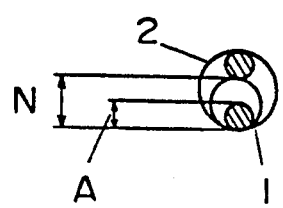

STEEL CORD FOR REINFORCEMENT OF RUBBER PRODUCTS

This application is a continuation of now abandoned application, Ser. No. 07/863,596, filed Apr. 3, 1992 which is a divisional of Ser. No. 07/630,325 filed on Dec. 19, 1990, now abandoned.

BACKGROUND OF THE INVENTION

This invention relates to a steel cord for reinforcement of rubber products of a novel twisting structure to be used for reinforcement of rubber products such as automobile tires, conveyor belts, etc.

Generally, a steel cord used for reinforcement of rubber products such as tires, etc. is composed by intertwisting 3, 4 or 5 pieces of material wires into a strand ($1 \times 3$, $1 \times 4$ or $1 \times 5$ construction) as shown in FIG. 7a to FIG. 7c. A steel cord (12) of this construction is composed by intertwisting a plural number of material wires (11) in close contact with one another and a cavity X is formed at the center of the cord. Such construction prevents good penetration of rubber compound into the cavity X at the central part of the steel cord at the time of vulcanization, leaving a continuous cavity as it is in the longitudinal direction of the cord. Tires using this type of steel cord, if they are damaged during the running of a car, produce a so-called "separation phenomenon" in which water penetrating through the damaged part reaches the cavity X and spreads in the longitudinal direction of the steel cord, thus corroding the steel cord and causing poor adhesion of steel cord to rubber compound to sharply reduce the service life of the tires.

However the development of wires of high strength in recent years has made it possible to reduce the number of material wires constituting the steel cord and, as a result, a steel cord for reinforcement of rubber of $1 \times 2$ construction as indicated in the official gazette No. PDS-62-234921 and No. PDS-62-117893 has also been developed (FIG. 8). In a steel cord (22) of this construction, the corrosion resistance of steel cord has been improved because the cavity X of the said steel cord (12) does not exist and the water penetrating through the damaged part of the tire does not spread in the longitudinal direction of the steel cord. However, a further improvement of fatigue resistance and flexibility is requested of steel cords to cope with the recent trend for higher speed of automobiles and meet the request for improvement of driving comfort. However, the said steel cord (22) of $1 \times 2$ construction was still poor in fatigue resistance and flexibility, because the material wires (21) which are in contact with each other are liable to produce fretting wear and no rubber compound penetrates into the portion of wire contacts forming a wire construction which seems as if it were made by twisting flat wires, leading to easy occurrence of buckling against repetitive compression and tensile and bending fatigue. Moreover the said steel cord was also unsatisfactory in the matter of corrosion resistance because the material wires which are in contact with each other cannot be covered completely with the rubber.

SUMMARY OF THE INVENTION

The present invention has been made for the purpose of providing a steel cord for reinforcement of rubber products with improved fatigue resistance, flexibility and corrosion resistance and has the characteristics as described hereunder.

Namely, the steel cord of the present invention is composed by intertwisting two material wires of a diameter of 0.25 to 0.40 mm, a carbon content of 0.75 to 0.88 wt % a twist pitch of 9.0 to 16.0 mm and an average of preforming rate of 105 to 150%.

Moreover, the said steel cords have sections of an about elliptical shape in about the same direction in the longitudinal direction and their ratio of length $D_1$ to breadth $D_2$ is $1.1 < D_1/D_2 < 2.2$. In addition, the steel cord of the present invention is composed of two material wires of a diameter of 0.25 to 0.40 mm and a carbon content of 0.75 to 0.88 wt % by intertwisting one of the material wires with another straight material wire at a twist pitch of 9.0 to 16.0 mm while being bent in a wavy spiral shape with a wave pitch equal to 0.1 to 0.7 times the twist pitch is such a way that the relation between the wavy outside diameter N and the diameter A of the material wire becomes as $N=(A+2/100)$ mm to $(A+2/10)$ min. With the above-mentioned construction, the steel cord of the present invention ensures good penetration of the rubber between the material wires. And yet, it has a sufficient strength of steel cord and a stable twisting. For that reason, in the case where this steel cord is used for rubber products such as tires, etc., it provides improved corrosion resistance, fatigue resistance and flexibility without sacrificing the ease of handling. Moreover, when this steel cord is used for tires, it can remarkably extend the service life of the tire and also improves the driving comfort.

BRIEF DESCRIPTION OF THE DRAWINGS

FIG. 1a is a schematic plan view indicating an example of the steel cord according to the present invention. FIGS. 1b-1h are cross-sectional views at lines I—I to VII—VII of FIG. 1a. FIG. 2a is a schematic plan view indicating an example of the steel cord according to the present invention having a cross section of elliptical shape. FIG. 2b is a front view of the above. FIGS. 2c-2i are cross-sectional views at lines I—I to VII—VII of FIG. 2a. FIG. 3a is a cross-sectional view of a steel cord having a gap between the material wires. FIG. 3b is a cross-sectional view of a densely twisted steel cord. FIG. 4a is a schematic plan view indicating an example of the steel cord according to the present invention. FIGS. 4b-4h are cross-sectional views at lines I—I to VII—VII of FIG. 4a.

DETAILED DESCRIPTION OF THE INVENTION

Figure 5:
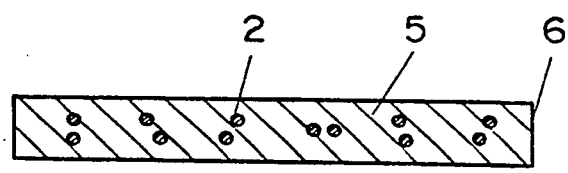
FIG. 5 is a cross-sectional view of a complex sheet provided with a buried steel cord.

The steel cord (2) according to the present invention is composed by twisting material wires (1), (1) of a diameter of 0.25 to 0.40 mm and a carbon content of 0.75 to 0.88 wt % at a twist pitch of 9.0 to 16.0 mm and an average of preforming rate of 105 to 150% as shown in FIG. 1.

Moreover, the said steel cord can also form a steel cord (2) having sections of nearly elliptical shape in about the same direction in the longitudinal direction and their ratio of length $D_1$ to breadth $D_2$ is $1.1 < D_1/D_2$ 2.2, by being passed through a straightener in which flat rollers of a small diameter are arranged in zigzag as shown in FIG. 2.

By the way, the said average of preforming rate means the value expressed by the following formula when the cord diameter obtained by densely twisting two material wires is represented by dc and the cord diameter obtained by twisting the material wires while keeping a small gap (t) between them is represented by do (the value of do being a mean value of the measured values at a plural number of points in the longitudinal direction), as shown in FIG. 3:

$$\text{Average of preforming rate } (R) = \frac{do}{dc} \times 100$$

However, since it is practically impossible to provide a fixed gap between the material wires in the longitudinal direction as shown in FIG. 3, there exist some points where the two wires are partially in contact with each other.

Moreover, in the case where the shape of the section is about elliptical, the calculation shall be made as $$do = \frac{D_1 + D_2}{2}$$

when the length of the ellipse is represented by $D_1$ and the breadth by $D_2$ (see FIG. 2). The value of do in the case where the shape of the section is elliptical is also a mean value of measured values at a plural number of points in the longitudinal direction.

The steel cord (2) of the above example can maintain the strength and the flexibility required of steel cord because the diameter, the carbon content and the twist pitch of the material wires are restricted as mentioned above. In addition, it can also ensure good penetration of a rubber compound between the material wires by providing a gap between the material wires (1) as shown in FIG. 1 and FIG. 2 because its average of preforming rate is set at 105 to 150%. And the corrosion resistance of the steel cord further improves and hardly any fretting wear due to friction of materials wires is produced because the material wires are entirely covered with the rubber compound. Yet, the respective material wires also play the role of reinforcement for rubber individually while serving as steel cord, thus preventing occurrence of buckling and improving the fatigue resistance and the flexibility of the steel cord.

Moreover, the steel cord (2) according to the present invention is made by using material wires of a diameter of 0.25 to 0.40 mm and a carbon content of 0.75 to 0.88 wt % and by twisting an about straight material wire (1) with a material wire (1) bent in a wavy spiral shape with a wave pitch M equal to 0.1 to 0.7 times the twist pitch C and in such a way that the relation between the wavy outside diameter N and the diameter A of the material wire becomes as N=(A+2/100) mm to (A+2/10) mm when the diameter of the material wire is placed as A, with a twist pitch of 9.0 to 16.0 ram, as shown in FIG. 4.

By the way, the above-mentioned wave pitch means M as indicated in FIG. 4a and its value against the twist pitch C is found within the range of M=0.1 C to 0.7 C. Wavy outside diameter N means the apparent outside diameter of a waved material wire as shown in FIGS. 4b–4h. Wavy spiral means about spiral forms made by intertwisting two material wires which may not necessarily be exactly spiral but may be just wavy if only they produce the same effect as that of a spiral.

The steel cord (2) of the above example can maintain the strength and the flexibility required of steel cord because the diameter, the carbon content and the twist pitch of the material wires are restricted as mentioned above. In addition, it can also ensure good penetration of the rubber compound between the material wires by providing a gap between the material wires as shown in FIGS. 4b–4h because one of the two material wires is bent in a wavy spiral shape with a wave pitch equal to 0.1 to 0.7 times the twist pitch and in such a way that the outside diameter N becomes as N=(A+2/100) mm to (A+2/10) mm when the diameter of the material wire is placed as A. And the corrosion resistance of the steel cord further improves and hardly any fretting wear due to friction of materials wires is produced because the material wires are entirely covered with the rubber compound. Yet, this type of steel cord is stable in twist structure and very easy for handling because the material wires are repeating contact and separation at proper intervals, thus preventing occurrence of buckling and improving the fatigue resistance and the flexibility of the steel cord.

By the way, the restrictions of values of the present invention are the results obtained from a large number of experiments, and here are the reasons for it.

The reason why the diameter of each material wire was decided as no less than 0.25 mm$\phi$ and no more than 0.40 mm$\phi$ is that, when the steel cord is used for tires, etc., 0.25 mm$\phi$ is the minimum requirement for obtaining a proper strength considering the smaller number of materials wires compared with conventional ones but a steel cord in excess of 0.40 mm$\phi$ lacks in flexibility.

As for carbon content, at least 0.75% is required to use a high tensile strength wire but a carbon content in excess of 0.88% leads to frequent breakings of wire in the drawing and twisting processes.

An excessively long twist pitch produces a lot of twisting errors of steel cord and makes the handling work difficult. For that reason, the twist pitch must be kept at no more than 16.00 min. However, if the twist pitch is under 9.0 ram, the steel cord becomes unfit for reinforcement of tires, etc. because of an excessively large elongation.

An average of preforming rate under 105% leads to insufficient penetration of rubber compound between the materials wires. On the contrary, if the average of preforming rate is higher than 150% the maintenance of dimensions at the time of forming becomes difficult due to an easy elongation of the wire and it also leads to poor workability in the calendering of rubber sheet. Therefore, the average of preforming rate should preferably be 105 to 150% and the ideal ratio is 130 to 145%.

Moreover, by making the section of the steel cord elliptical as shown in FIG. 2, it becomes possible to promote the penetration of rubber between the material wires while improving the stability of twisting. It is also effective against compressive and bending fatigue and makes it possible to reduce the thickness of the rubber sheet covering the steel cord. However, such effect cannot be expected if $D_1/D_2$ is under 1.1, but if $D_1/D_2$ is more than 2.2, the fatigue resistance of the steel cord deteriorates since the wire easily buckles when it is compressed in the longitudinal direction. Therefore, it is ideal to keep $D_1/D_2$ in the range of $1.1 < D_1/D_2 > 2.2$.

As for the wavy spiral of the material wires, there is a general tendency that, if the wave pitch is smaller than 0.1 times the twist pitch, the elongation at the time of a low-load traction gets larger, making it difficult to maintain the dimension at the time of forming. If the wave pitch is larger than 0.7 times the twist pitch, the twisting becomes proper and the steel cord deteriorates in in fatigue resistance and handling workability. If the wavy outside diameter is smaller than (A+2/100) mm, the penetration of rubber becomes insufficient, but if it is larger than (A+2/10) mm the maintenance of dimensions at the time of forming becomes difficult because of an easy elongation of the wire and it also leads to poor workability in the calendering of rubber sheet.

Example 1

Next, we will explain concretely an example of the present invention, a conventional example and a reference example. Table 1 indicates the results of tests of various kinds of steel cord made by intertwisting two material wires provided with brass plating on the surface, with variations in material wire diameter, carbon content, twist hitch, average of preforming rate and shape of section of the steel cord.

TABLE 1

|  | Experiment No. | A (mm) | B (%) | C (mm) | D (%) | E | F | G (kgf) | H (%) | I | J (%) | K |
|---|---|---|---|---|---|---|---|---|---|---|---|---|
| Conventional example | 1 | 0.30 | 0.82 | 14 | 100 | Circle | 1 | 44.3 | 0 | 100 | 0.10 | ○ |
|  | 2 | 0.28 | 0.83 | 16 | 100 | Circle | 1 | 30.7 | 0 | 102 | 0.09 | ○ |
| Reference example | 3 | 0.25 | 0.73 | 14 | 103 | Circle | 1 | 23.9 | 30 | 103 | 0.14 | ○ |
|  | 4 | 0.33 | 0.80 | 8 | 103 | Circle | 1 | 48.2 | 25 | 102 | 0.56 | Δ |
|  | 5 | 0.23 | 0.73 | 17 | 160 | Circle | 1 | 19.4 | 100 | 88 | 0.61 | x |
|  | 6 | 0.33 | 0.80 | 7 | 155 | Circle | 1 | 47.3 | 100 | 94 | 0.63 | x |
| Example | 7 | 0.25 | 0.76 | 9 | 107 | Circle | 1 | 27.5 | 68 | 107 | 0.31 | ○ |
|  | 8 | 0.30 | 0.80 | 14 | 120 | Circle | 1 | 43.8 | 95 | 112 | 0.44 | ○ |
|  | 9 | 0.35 | 0.83 | 14 | 145 | Circle | 1 | 50.6 | 100 | 113 | 0.42 | ○ |
|  | 10 | 0.35 | 0.80 | 16 | 135 | Ellipse | 1.2 | 50.2 | 100 | 118 | 0.40 | ○ |
|  | 11 | 0.30 | 0.80 | 10 | 140 | Ellipse | 1.8 | 43.5 | 100 | 121 | 0.42 | ○ |
|  | 12 | 0.30 | 0.80 | 10 | 145 | Ellipse | 2.1 | 43.3 | 100 | 119 | 0.45 | ○ |
| Reference example | 13 | 0.30 | 0.80 | 10 | 120 | Ellipse | 2.4 | 41.6 | 94 | 99 | 0.55 | Δ |

Figure 8A:
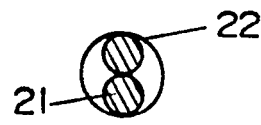
Figure 8B:

The symbols in the Table indicate the following respectively:

A: Material wire diameter (mm);
B: Carbon content (wt %);
C: Twist pitch (ram);
D: Average of preforming rate (%);
E: Shape of section;
F: $D_1/D_2$;
G: Breaking load (kgf);
H: Penetration ratio of rubber compound between material wires (%),
I: Resistance to compressive, tensile & bending fatigues;
J: Elongation at a 5 kg load (%);
K: Handling workability Experiments No. 1 & 2 represent the conventional steel cord indicated in the said official gazette No. PDS-62-234921 and No. PDS-62-117893 as shown in FIG. 8. Experiments No. 7–9 indicate the steel cord (2) according to the invention of the present application with a nearly round section shape which is the example indicated in FIG. 1. Experiments No. 10–12 show the steel cord (2) according to the invention of the present application with a nearly elliptical section shape which is the example indicated in FIG. 2. Experiments 3–6 are of the steel cords of reference example. The average of preforming rate can be easily adjusted by changing the intervals, dimensions, etc. of waving pins of the stranding machine, while an elliptical section can be easily obtained by passing the cord through a straightener in which flat rollers of a small diameter are arranged in zigzag. A buncher type stranding machine was used for this experiment. And a complex sheet (6) was prepared by covering the steel cord (2) of this example with rubber sheets (5) from the top and bottom sides. The complex sheet was obtained in the same way also for the conventional example and the reference example.

Figure 6:
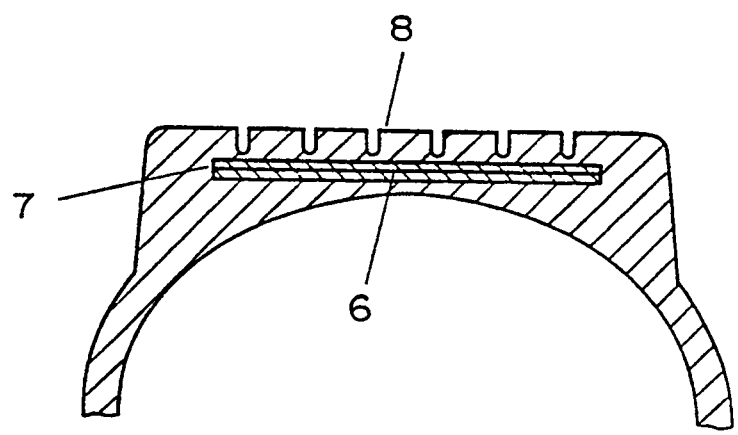
FIG. 6 is a partial enlarged cross-sectional view of a tire using a complex sheet for the belt.
Figure 7A:
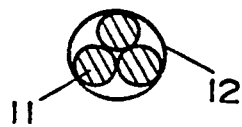
FIGS. 7a to 7c and FIG. 8a and 8b are cross-sectional views of conventional and recent steel cords, respectively.
Figure 7B:
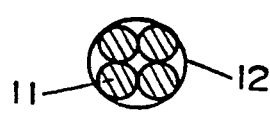
Figure 7C:
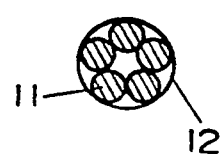

Moreover, this complex sheet was used for the belt (7) of a tire (8) as shown in FIG. 6. And the breaking strength of such various steel cords in each state, the penetration rate of rubber compound between material wires in the case of vulcanization of rubber, the compressive tensile and fatigue resistance as complex with the rubber and the handling workability at the time of processing of rubber product were evaluated as described hereunder.

Breaking load (G):

This is a breaking load of steel cord only and its value must be at least equal to 25 kgf for this type of steel cords.

Penetration ratio of rubber compound (H):

After burying the cord in rubber and vulcanizing it, we extracted the steel cord and peeled off its material wires. The penetration ratio is the degree of penetration of rubber compound on the face of contact of two material wires expressed in percentage. This value must be no less than 60.

Compressive tensile and fatigue resistance (I):

A plural number of steel cords were buried in a rubber sheet and the compressive tensile and fatigue resistance was evaluated with this sheet by using a 3-point pulley bending fatigue tester. The results of the test are expressed in index against base 100 of experiment No. 1. The cord is eventually broken by fretting wear, buckling, etc. and the evaluation is made by the number of times of repetition up to the time of breaking.

Handling workability

This means the handling workability of steel cord in the manufacture, in the burial in rubber sheet and in the forming process of tires, etc. including ease of flaring, low-load elongation, intertwisting between steel cords, straightness, etc. of steel cord. The evaluation was made as x if much inferior compared with the conventional article, Δ if slightly inferior and as if there is no difference between the two.

As it is clearly seen from Table 1, the steel cord of the present example has the required breaking load of 25 kgf, indicates a good penetration of rubber compound between the material wires, has an improved fatigue resistance and is about the same as the conventional article in the matter of handling workability. As it was used for tires, the steel cord of the present example remarkably extended the service life of the tires and improved the driving comfort. A steel cord with elliptical section can reduce the thickness of the rubber sheet making it possible to reduce the weight of tires and can also improve the driving comfort of a car.

Example 2

Next, we will explain concretely another example of the present invention in comparison with a conventional example and a reference example. Table 2 indicates the results of tests of various kinds of steel cord made by intertwisting two material wires provided with brass plating on the surface, with variations in material wire diameter, carbon content, twist pitch, wave pitch of wavy spiral and wavy outside diameter of the steel cord.

TABLE 2

| | Experiment No. | A (mm) | B (%) | C (mm) | L M | L N | G (kgf) | H (%) | I | J (%) | K |
|---|---|---|---|---|---|---|---|---|---|---|---|
| Conventional example | 1 | 0.30 | 0.82 | 14 | none | none | 44.3 | 0 | 100 | 0.10 | ○ |
| | 2 | 0.28 | 0.83 | 16 | none | none | 30.7 | 0 | 102 | 0.09 | ○ |
| Reference example | 14 | 0.25 | 0.73 | 14 | 1.0 | 0.26 | 23.6 | 35 | 103 | 0.14 | ○ |
| | 15 | 0.33 | 0.80 | 8 | 0.7 | 0.34 | 47.8 | 28 | 103 | 0.18 | △ |
| | 16 | 0.23 | 0.73 | 17 | 13.0 | 0.50 | 18.6 | 100 | 93 | 0.65 | x |
| | 17 | 0.35 | 0.80 | 7 | 6.0 | 0.57 | 49.5 | 100 | 98 | 0.70 | x |
| Example | 18 | 0.25 | 0.75 | 9 | 1.2 | 0.27 | 28.0 | 65 | 116 | 0.31 | ○ |
| | 19 | 0.30 | 0.80 | 14 | 3.0 | 0.35 | 45.2 | 98 | 118 | 0.40 | ○ |
| | 20 | 0.30 | 0.85 | 14 | 3.0 | 0.40 | 49.4 | 100 | 122 | 0.45 | ○ |
| | 21 | 0.35 | 0.83 | 16 | 11.0 | 0.40 | 50.6 | 100 | 117 | 0.43 | ○ |
| | 22 | 0.40 | 0.80 | 10 | 4.0 | 0.45 | 61.5 | 100 | 110 | 0.41 | ○ |

The symbols A to C and G to N in the Table are the same as those for Example 1, i.e.

A: material wire diameter (mm);
B: Carbon content (wt %);
C: Twist pitch (mm);
G: Breaking load (kgf);
H: Penetration ratio = rubber compound between material wires (%),
I: Resistance to compressive, tensile & bending fatigues;
J: Elongation at a 5 kg load (%);
K: Handling workability;
L: Irregularity of spiral (mm);
M: Wave pitch;
N: Wavy outside diameter Experiments No. 1 & 2 represent the same conventional steel cord as that of Example 1. Experiments No. 18 to 22 indicate the steel cord of the example given in FIG. 4. Experiments No. 14 to 17 show the steel cord of the reference example.

The wavy spiral of one material wire can be easily prepared by adjusting the intervals, dimensions, etc. of waving pins of the stranding machine, and by passing the cord through a straightener in which flat rollers of a small diameter are arranged in zigzag. This is also possible by twisting a single wire bitten in gears, etc. before inserting it in the stranding machine. In that case, the shape of the gears and the number of times of twisting of the single wire, etc. must be adjusted.

The steel cord in this experiment was formed in a wavy spiral with a buncher type stranding machine and by being passed through 3 to 5 pins of a curling cone provided in front of the gathering point of the strand.

And a complex sheet (6) was prepared by covering the steel cord of this example with rubber sheets (5) from the top and the bottom sides as shown in FIG. 5. The complex sheet was obtained in the same way also for the conventional example and the reference example.

Moreover, this complex sheet (6) was used for the belt (7) of a tire (8) as shown in FIG. 6.

And the breaking strength of such various steel cords in each state, the penetration rate of rubber compound between material wires in the case of vulcanization of rubber, the compressive tensile and fatigue resistance as complex with the rubber and the handling workability at the time of processing of rubber product were evaluated as described hereunder.

As it is clearly seen from Table 2, the steel cord of the present example has the required breaking load of 25 kgf, indicates a good penetration of rubber compound between the material wires and has an improved fatigue resistance. Moreover, its handling workability was also good because of a stable twisting structure. As it was used for tires, the steel cord of the present example remarkably extended the service life of the tires and improved the driving comfort.

What is claimed is:

1. A steel cord for reinforcement of rubber products, comprising:
   a twisted cord formed of only two material wires twisted together at a primary twist pitch of 9.0 to 16.0 mm;
   where each of said two material wires has a diameter A of 0.25 to 0.40 mm and a carbon content of 0.75 to 0.88 wt %; and
   wherein, in said twisted cord, one of said two material wires has substantially no preformed spiral shape and the other of said two material wires is preformed with a secondary substantially spiral shape at a secondary pitch which is substantially smaller than said primary twist pitch.

2. A steel cord as recited in claim 1, wherein said secondary pitch is equal to 0.1 to 0.7 times said primary twist pitch.

3. A steel cord as recited in claim 2, wherein a wavy outside diameter N of said other material wire is related to said diameter A of said material wires by $N = (A + 2/100)$ mm to $(A + 2/10)$ mm.

4. A steel cord as recited in claim 1, wherein a wavy outside diameter N of said other material wire is related to said diameter A of said material wires by $N = (A + 2/100)$ mm to $(A + 2/10)$ mm.

5. A tire comprising:

a plurality of steel cords;
a rubber sheet covering said plurality of steel cords; and
wherein each of said plurality of steel cords comprises
a twisted cord formed of only two material wires twisted together at a primary twist pitch of 9.0 to 16.0 mm,
wherein each of said two material wires has a diameter A of 0.25 to 0.40 mm and a carbon content of 0.75 to 0.88 wt %, and
wherein, in said twisted cord, one of said two material wires has substantially no preformed spiral shape and the other of said two material wires is preformed with a secondary substantially spiral shape at a secondary pitch which is substantially smaller than said primary twist pitch.

6. A tire as recited in claim 5, wherein
said secondary pitch is equal to 0.1 to 0.7 times said primary twist pitch.

7. A tire as recited in claim 6, wherein
for each of said plurality of steel cords, a wavy outside diameter N of said other material wire is related to said diameter A of said material wires by $N = (A + 2/100)$ mm to $(A + 2/10)$ mm.

8. A tire as recited in claim 5, wherein
for each of said plurality of steel cords, a wavy outside diameter N of said other material wire is related to said diameter A of said material wires by $N = (A + 2/100)$ mm to $(A + 2/10)$ mm.

* * * * *